United States Patent
Li et al.

(10) Patent No.: US 8,099,320 B2
(45) Date of Patent: *Jan. 17, 2012

(54) PRODUCT DEMAND FORECASTING

(75) Inventors: Sheng Li, Palo Alto, CA (US); Hans Karsten Schierholt, Montreal (CA); Olaf S. Dudat, Heidelberg (DE); Ralf Heimburger, St. Leon-Rot (DE); Carole Ann Kamp, Tremont, IL (US); Thomas Jon Van Kley, Ann Arbor, MI (US); Gary L. Vasi, Troy, MI (US); Hans Schmitz, Buskirchen (DE)

(73) Assignee: SAP Aktiengesellschaft, Walldorf (DE)

( * ) Notice: Subject to any disclaimer, the term of this patent is extended or adjusted under 35 U.S.C. 154(b) by 1649 days.

This patent is subject to a terminal disclaimer.

(21) Appl. No.: 11/250,965

(22) Filed: Oct. 14, 2005

(65) Prior Publication Data

US 2006/0111963 A1    May 25, 2006

(30) Foreign Application Priority Data

Oct. 15, 2004   (EP) .................................... 04105097

(51) Int. Cl.
*G06Q 10/00* (2012.01)
(52) U.S. Cl. ...................................... 705/7.31; 705/7.29
(58) Field of Classification Search .................... None
See application file for complete search history.

(56) References Cited

U.S. PATENT DOCUMENTS

| | | | | |
|---|---|---|---|---|
| 5,712,985 A * | 1/1998 | Lee et al. | ...................... | 705/7.31 |
| 6,978,249 B1 * | 12/2005 | Beyer et al. | ...................... | 705/10 |
| 7,092,929 B1 * | 8/2006 | Dvorak et al. | .................. | 705/28 |
| 7,319,972 B2 * | 1/2008 | von Gonten et al. | ............ | 705/10 |
| 7,379,890 B2 * | 5/2008 | Myr et al. | ........................ | 705/10 |
| 7,398,270 B1 * | 7/2008 | Choi et al. | ....................... | 707/6 |
| 7,424,440 B1 * | 9/2008 | Gupta et al. | ..................... | 705/10 |
| 7,542,883 B2 * | 6/2009 | Kumazawa et al. | .............. | 703/2 |
| 7,590,937 B2 * | 9/2009 | Jacobus et al. | ................ | 715/700 |
| 2002/0143665 A1 * | 10/2002 | Santos et al. | .................... | 705/28 |
| 2003/0065555 A1 * | 4/2003 | von Gonten et al. | ............ | 705/10 |
| 2003/0144897 A1 * | 7/2003 | Burruss et al. | .................. | 705/10 |
| 2003/0149578 A1 * | 8/2003 | Wong | ................................ | 705/1 |
| 2003/0167146 A1 * | 9/2003 | Tezuka et al. | ................. | 702/129 |
| 2003/0177055 A1 * | 9/2003 | Zimmerman et al. | .......... | 705/10 |
| 2004/0064357 A1 * | 4/2004 | Hunter et al. | ................... | 705/10 |
| 2004/0068454 A1 * | 4/2004 | Jacobus et al. | .................. | 705/36 |
| 2004/0153187 A1 * | 8/2004 | Knight et al. | ................... | 700/99 |
| 2004/0243459 A1 * | 12/2004 | Geritz et al. | ..................... | 705/10 |
| 2005/0060242 A1 * | 3/2005 | Armstrong et al. | ............. | 705/28 |
| 2005/0096963 A1 * | 5/2005 | Myr et al. | ....................... | 705/10 |
| 2005/0102175 A1 * | 5/2005 | Dudat et al. | .................... | 705/10 |
| 2005/0114171 A1 * | 5/2005 | Siegalovsky et al. | ............. | 705/2 |
| 2005/0149377 A1 * | 7/2005 | Schierholt | ........................ | 705/10 |
| 2005/0273380 A1 * | 12/2005 | Schroeder et al. | ............... | 705/10 |
| 2006/0085244 A1 * | 4/2006 | Foerster et al. | ................... | 705/8 |

* cited by examiner

*Primary Examiner* — Lynda Jasmin
*Assistant Examiner* — Brett Feeney
(74) *Attorney, Agent, or Firm* — Blakely, Sokoloff, Taylor & Zafman LLP

(57) ABSTRACT

Embodiments include a system for forecasting demand data for new products. The system and method may include generating a phase-in group profile based on similar products. The phase-in group profile may have multiple demand profiles for low, medium and high demand variations. These demand profiles may be applied to new products in the same phase-in group to generate a forecast profile.

16 Claims, 5 Drawing Sheets

FIG. 3

| | Mon1 | Mon2 | Mon3 | Mon4 | Mon5 | Mon6 | Sum | Profile Average | Demand Profile |
|---|---|---|---|---|---|---|---|---|---|
| F | 0 | 0 | 0 | 2 | 6 | 20 | 28 | | L |
| L | 0 | 0 | 1 | 5 | 8 | 15 | 29 | Average: 28.5 | L |
| H | 3 | 6 | 8 | 12 | 15 | 20 | 64 | | L |
| M | 20 | 40 | 30 | 20 | 10 | 0 | 120 | | M |
| O | 5 | 14 | 25 | 30 | 35 | 25 | 134 | | M |
| K | 0 | 5 | 15 | 25 | 40 | 60 | 145 | Average: 205.3 | M |
| C | 20 | 30 | 40 | 60 | 80 | 60 | 290 | | M |
| B | 0 | 4 | 20 | 60 | 100 | 150 | 334 | | H |
| I | 10 | 20 | 50 | 50 | 100 | 120 | 350 | | H |
| D | 10 | 60 | 30 | 80 | 120 | 130 | 430 | Average: 432.6 | H |
| A | 10 | 20 | 50 | 70 | 120 | 165 | 435 | | H |

FIG. 4

| Profile | Mon1 | Mon2 | Mon3 | Mon4 | Mon5 | Mon6 | St Dev |
|---|---|---|---|---|---|---|---|
| Low | 1,00 | 2,00 | 3,00 | 6,33 | 9,67 | 18,33 | 3,1798 |
| Med | 11,25 | 22,25 | 27,50 | 33,75 | 41,25 | 36,25 | 17,608 |
| Hig | 7,50 | 26,00 | 37,50 | 65,00 | 110,00 | 141,25 | 13,815 |
| | | | | | | Total | 34,603 |

# PRODUCT DEMAND FORECASTING

BACKGROUND

1. Field of the Invention

The invention relates to automated supply chain management. Specifically, predicting future demand for a set of new products.

2. Background

A supply chain is a network of retailers, distributors, transporters, warehouses, and suppliers that take part in the production, delivery and sale of a product or service. Supply chain management is the process of coordinating the movement of the products or services, information related to the products or services, and money among the constituent parts of a supply chain. Supply chain management also integrates and manages key processes along the supply chain. Supply chain management strategies often involve the use of software to project and fulfill demand and improve production levels.

Logistics is a subset of the activities involved in supply chain management. Logistics includes the planning, implementation and control of the movement and storage of goods, services or related information. Logistics aims to create an effective and efficient flow and storage of goods, services and related information from a source to the target location where the product or source is to be shipped to meet the demands of a customer.

The movement of goods and services through a supply chain often involves the shipment of the goods and services between the source location at which the product is produced or stored and the target location where the product is to be shipped to the wholesaler, vendor or retailer. The shipment of products involves a transport such as a truck, ship or airplane and involves the planning of the quantity of the products to be shipped in the transport. The source location from which a set of products is shipped on a transport is selected based on the availability of the products at the source location.

Supply chain management systems generate demand forecast data based on a past order or demand history for each product to be shipped. New products do not have a past order or demand history. This forces a human guess to be used to determine shipment and inventory levels for new products. As a consequence, poor guesses result in inappropriate quantities of new items being shipped to target locations and inefficient use of inventory space at source and target locations.

SUMMARY

Embodiments include a system for forecasting demand data for new products or products without a demand or order history. The system and method may include forecasting demand for a chosen time period. A forecast profile may be generated based on demand patterns in similar products. The group phase-in profiles may be utilized to calculate demand for a new product over the chosen time period.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

FIG. 3 is an example sorted phase-in group.

FIG. 4 is an example demand volume and standard deviation for each demand profile.

DETAILED DESCRIPTION

Figure 1:
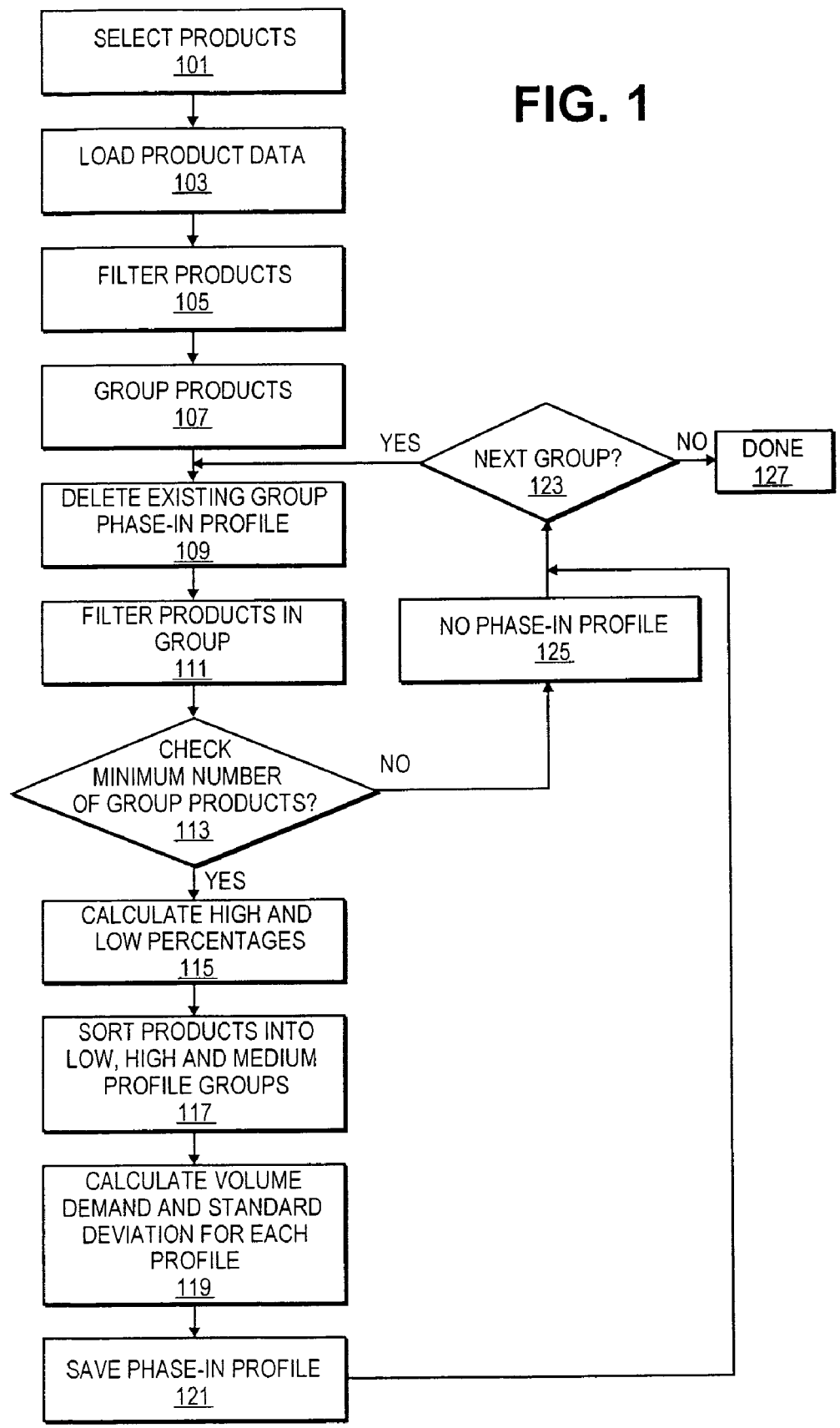
FIG. 1 is a flowchart of one embodiment of a process for generating a group phase-in profile.

FIG. 1 is a flowchart of one embodiment of a process for generating a group phase-in profile. In one embodiment, the process may be a part of a planning service manager or similar software application that provides a user with a set of tools for managing the logistics of supply chain management. The process to generate a group phase-in profile may be embodied in a module, service or similar program for use by the planning service manager or for stand alone usage. A group phase-in profile may be a data structure that may be used to represent the demand patterns for a set of constituent products. As used herein a 'set' may denote any number of items including one item.

In one embodiment, a set of products may be designated by a user to be processed for use in generating a group phase-in profile by a group phase-in generator module (block 101). In one embodiment, the set of selected products may have associated data stored in a database or similar persistent storage system that is accessible to the planning service manager or group phase-in profile generator module. The data associated with each product may include demand or order history data, a phase-in group designation, production effective date (PED) and similar history data. The selected data may be loaded by the phase-in profile generation module to be processed (block 103). In one embodiment, the data may be loaded from a master product file, database or similar system.

In one embodiment, the set of products may be filtered to remove products that do not meet designated criteria (block 105). The data may be filtered to remove data related to products that do not have designated phase-in groups, PEDs, sufficient history length, that are successor products or based on similar criteria designated by a user. In one embodiment, a minimum history length of a year may be designated as a filter criteria.

In one embodiment, the remaining products and their associated data may be sorted into phase-in groups (block 107). The products and their associated data may be sorted based on the designated phase-in group of the product. A phase-in group may contain any number of products and any amount of history data. In one embodiment, products in a phase-in group may have similar characteristics that makes their demand volume likely to be similar over time. In one embodiment, the user may designate a history range for data to be utilized. Data associated with the product outside the range may not be retrieved or may be subsequently discarded if present. The products and their associated data may be structured as a group phase-in profile.

In one embodiment, if previously generated group phase-in profiles exist they may be deleted (block 109). In another embodiment, old group phase-in profiles may be archived or deleted after a new group phase-in profile is completed. Group phase-in profiles may be created or processed one by one or in parallel, if multiple groups are in the selected product set. Old group phase-in profiles may be deleted as corresponding new group phase-in profiles are generated or processed.

In one embodiment, a phase-in group chosen for processing may have its constituent products and their associated data filtered based on a set of parameters specified by the user (block 111). The parameters may include length or number of history periods covered by the associated data, volume/demand variation limits, PED dates and similar parameters. The criteria may be required of a product over history range designated by the user. In one embodiment, products not meeting the criteria may be excluded from further use in generating the group phase-in profile. In another embodiment, the products and data may be deleted from the group phase-in profile.

In one embodiment, a check may be made after filtering the products in the phase-in group to determine if a minimum number of products remain in the group (block 113). A user may specify any number as a minimum product number. A minimum number of products may be specified to ensure that a group phase-in profile has sufficient data to provide an accurate or representative profile. In one embodiment, if the minimum product count is not met for a phase-in group then no group phase-in profile may be created (block 125). The process may then check to determine if additional groups remain to be processed (block 123). If no groups remain to be processed the group phase-in generator module may exit or halt the processing of product groups (block 127). If additional groups remain to be processed then the application proceeds to the next group to be processed.

In one embodiment, if there are a sufficient number of products in the group, a high and low volume average may be calculated for the designated time period (block 115). The low volume demand average may be calculated by averaging the demand for the time period using the two lowest demand volume products in the phase-in group or a similar subset of products in the phase-in group. Similarly, the high volume demand average may be calculated by averaging the demand for the time period using the two highest demand volume products in the phase-in group or a similar subset of products. A medium volume demand average may also be calculated utilizing the remaining product volume demand for the time period, e.g., those products not utilized to calculate the low and high demand volume average. These averages may be stored temporarily or as part of the group profile phase-in data structure. If there are a small number of products, this categorization may be skipped. If there are a large number of products in the group, additional categories of demand averages may be calculated. The number of averages calculated and categories created may be determined by a user setting volume variation percentage parameters or similar parameters that indicate the criteria for creating additional categories that require defining averages.

In one embodiment, all of the products in the phase-in group may be sorted into a set of categories based on their demand volume for the time period (block 117). The categories may include low demand volume, medium demand volume, high demand volume or additional variations on these demand levels or subsets of these demand levels. The low, medium and high demand volume categories may be defined in relation to the low, medium and high demand volume averages. Products may be sorted into these categories by comparing the demand volume to each average and grouping the product with the average to which it is closest. Each of these grouping may form a part of a separate demand profile within the group phase-in profile.

In one embodiment, each demand profile may have a demand volume calculated for each segment of the designated time period as well as a standard deviation for the time period (block 119). For example, if the time period is six months and the segments of the time period are months, a demand volume may be calculated for each month in each demand profile by averaging demand volume for the products in the demand profile for each month. In this example, the months may not be from a single calendar month, but corresponding months subsequent to each product PED. Thus, the first month each product was available may be the first month in the demand profile for each product.

In one embodiment, the group phase-in profile including its constituent demand profiles may be stored in a persistent storage system (block 121). The group phase-in profile may be stored as a discrete data structure, a set of data structures or similar storage format. After the generated group phase-in profile has been completed and stored, the application may continue processing the selected set of products by determining if further phase-in groups remain to be processed (block 123). If no groups remain to be processed, then the group phase-in profile generator may terminate or end its processing of the set of products (block 127). If further groups remain to be processed the group phase-in profile generator may start the processing of the next phase-in group.

In one embodiment, the process of generating a group phase-in profile may be repeated on a periodic basis or on receipt of updated demand data. Updated demand data may be received and made available to the planning services manager over time. For example, additional demand data may be received periodically from retailers. The group phase-in profile generation process may be run each time updated demand data is made available or on a periodic basis. In one embodiment, a check may be made to determine if more products have been added to a phase-in group or if the prior product data has been updated before running an update. If no products or product data has been added or updated, then the group phase-in profile does not need to be updated.

Figure 2:
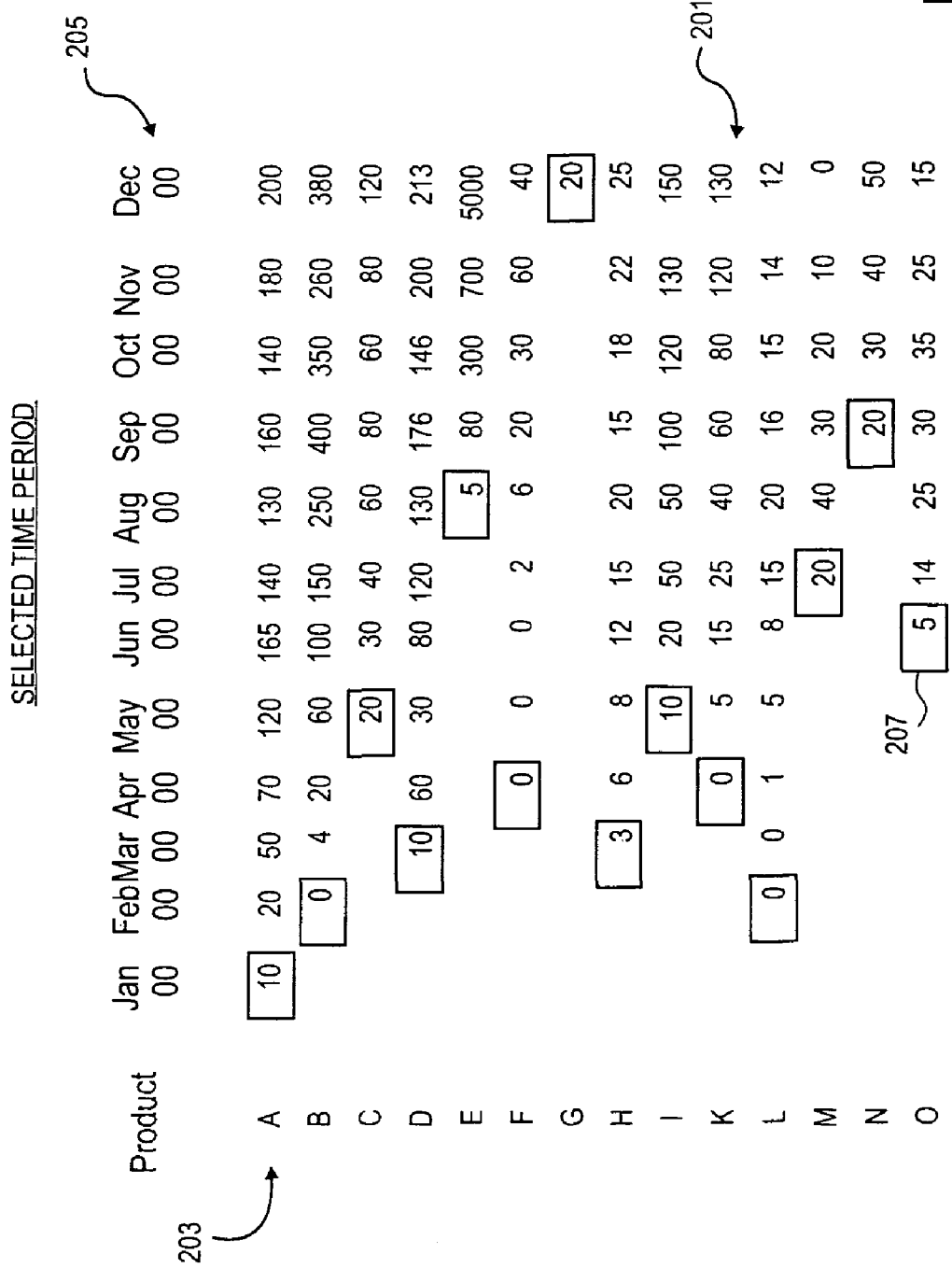
FIG. 2 is an example phase-in group data set.

FIG. 2 is a chart of an example representation of a phase-in group. In one embodiment, the phase-in group may be composed of a set of products 203 (labeled A-O). These products may each have a demand volume history 201 that is composed of the number of products shipped, sold or similarly required for each segment of a selected time period. In this example, the selected time period 205 ranges from January 2000 through December 2000. The time period is divided into a set of segments. In the example, the time period is divided into months. The phase-in group may also track the PED 207 for each product. Data in the phase-in group may be in any form or metric. In the example, the data is in the form of units shipped in the context of supply chain management. The time period may have any length, start date, end date or similar definition. The time period may be subdivided in any manner including, months, weeks, days, hours or similar subdivisions or combinations thereof.

FIG. 3 is a chart of an example representation of the sorted and filtered phase-in group from FIG. 2. The sorted phase-in group includes a set of products 203 meeting all the requirements of the filter process, demand volume data 201 for a desired time period 301 or minimum data set size; an accumulated demand 317 for the time period or data set; average demand volume 309, 311, 313 for a set of demand profiles and labels or indicators 303, 305, 307 for each product categorizing them into the demand profiles.

In the example, the set of products is filtered to remove products that do not have at least six months of demand data. Products E, G and N were removed for lacking the requisite history data. The products are sorted according to total demand volume 317 for the time period 301. The time period is a six month time period. The data for each product for the six months subsequent to the PED of each product is utilized. Low demand profile average 313 is an average of products F and L. High demand profile average 313 is an average of products A and D. Medium demand profile average 311 is an average for the remaining products.

The products F, L and H are assigned a low demand profile indicator 303, because the total demand for each of these products for the time period is closest to the low demand profile average. Similarly, the remaining products are assigned either medium demand profile or high demand profile indicators based on the average to which they are closest.

FIG. 4 is a chart of an example generated demand profile set based on the sorted phase-in group of FIG. 3. The demand profiles 401, 403, 405 are composed of data values 407 for each of the time segments 301 and a standard deviation calculation 409. Each demand profile 401, 403, 405 may have its data values 407 calculated by averaging the demand volume values for its constituent products for the time segment. Thus, the low demand profile for month one has a value of one which is the average demand volume for products F, L and H in month one of the time period. The remaining demand volume values may be calculated in a similar manner. The standard deviation may be calculated using any standard deviation formula.

Figure 5:
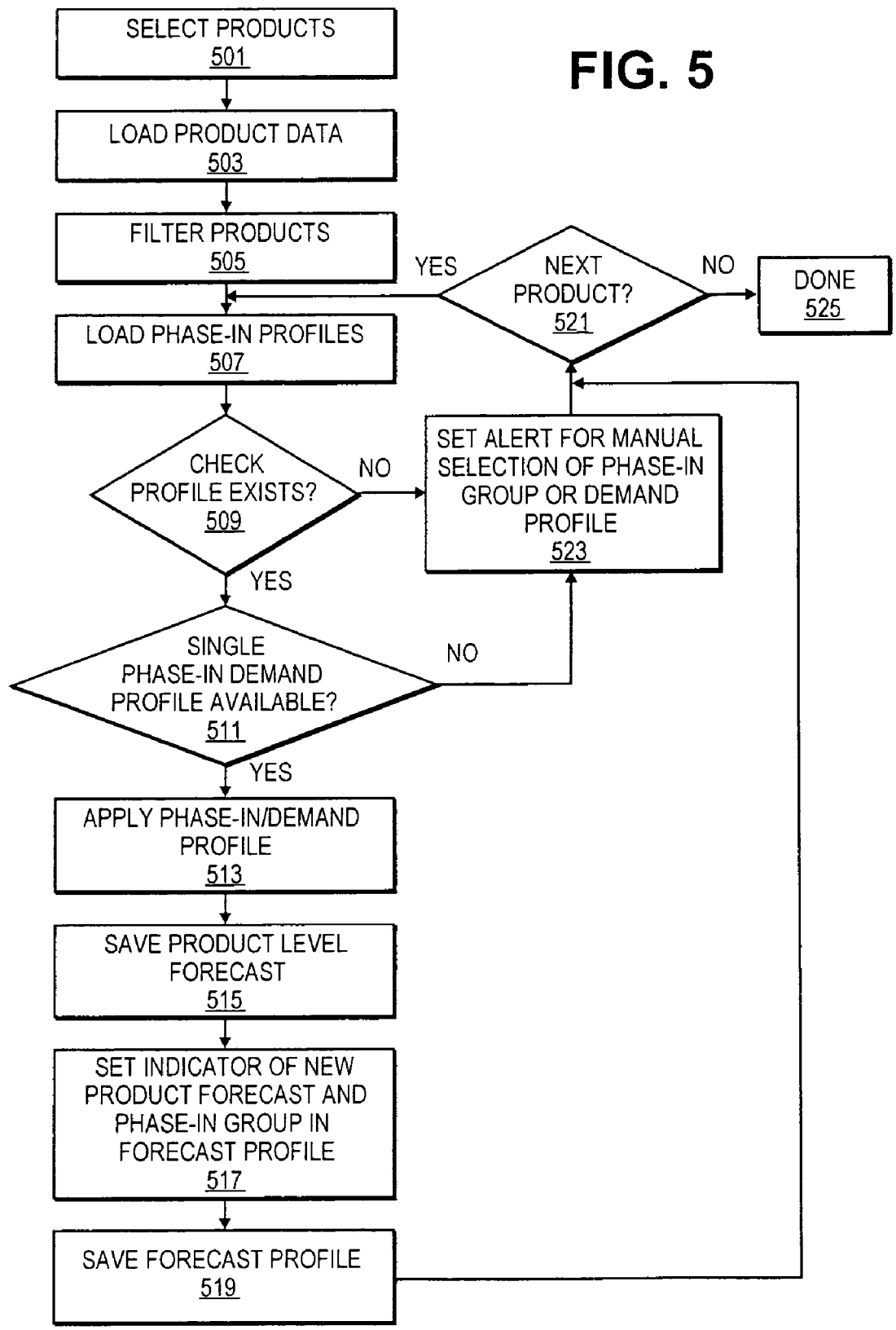
FIG. 5 is a flowchart of one embodiment of a process generating a forecast profile for a new product.

FIG. 5 is a flowchart of one embodiment of a process for generating a forecast profile for a new product. In one embodiment, the forecast profile is a set of demand volume values for a selected time period that are chosen to reflect the expected demand. The forecast profile may be used to determine the volume of products to be shipped to a target location and for similar actions. These forecast profiles may be generated by a forecast profile generation application.

In one embodiment, a user selects a set of products that the forecast application is to process (block 501). The forecast application may be a part of a planning service management application or a stand alone application. The set of products may be stored in a database or similar persistent storage system accessible to either the planning service management application or the stand alone application. In one embodiment, after the set of products is determined the application loads product information for processing (block 503). This information may include an indicator of a phase-in group to which the product belongs, a PED, a new product indicator or similar data and information.

In one embodiment, the forecast application filters the selected products based on a set of designated criteria (block 505). Criteria may include requirement that a phase-in group has been assigned, a PED has been assigned, a new product flag has been set, whether the product is a replacement or interchangeable product or similar filtering criteria. These criteria may be used to eliminate products that are not new products in need of a forecast demand volume or new products without requisite data for generating a forecast demand volume.

In one embodiment, after the products have been filtered, all related phase-in profiles may be loaded. In another embodiment, the products may be processed sequentially and the needed phase-in profile may be loaded for each product as it is processed. Products may be processed serially or in parallel. As each product is processed a check may be made to determine if a corresponding phase-in group profile exists (block 509). If no phase-in group profile exists then an alert may be set for a user of the forecast application (block 523). A check may then be made to determine if any further products remain to be processed (block 521). If no further products remain to be processed then the forecast application may terminate or end processing the selected products (block 525). If further products remain to be processed, the next product or set of products is selected for processing and their phase-in group profiles may be loaded (block 507).

In one embodiment, if a phase-in group profile is available a check may be made to determine if a demand profile has been selected or if multiple demand profiles are available (block 511). If the demand profile is uncertain, an alert may be set for the user or administrator of the forecast application (block 523). A check may then be made if further products remain to be processed (block 521).

In one embodiment, if the demand profile is determined then the phase-in group and demand profile are applied to the corresponding product (block 513). The demand profile data including the demand volume data for each time segment may be copied by the forecast application to be associated with the new product. A forecast for a new product may have a longer or shorter time period than the data available in the group phase-in profile. If less data is required, then only the needed time segments and standard deviation data are copied from the group phase-in profile. If additional time segments are needed the final time segment value from a group phase-in profile may be utilized for all subsequent time frames in the forecast profiles. Alternatively, a trajectory of demand may be calculated based on available data to predict subsequent time periods or similar techniques may be utilized to generate addition time segment values.

In one embodiment, this copied and derived data may be stored in association with the new product in a forecast profile or similar data structure (block 515). Additional data may be set in the forecast profile including an indicator that the data structure is a forecast for a new product, phase-in group indicator, demand profile indicator or similar data related to the forecast profile and product (block 517). After these additional data values and indicators have been set the forecast profile may be saved in a persistent storage system such as a database or similar system (block 519). If additional products remain to be processed then the forecast application may continue to process those products.

In one embodiment, the process of generating a new product forecast and a forecast profile may be repeated on a periodic basis or on receipt of updated demand data. Updated demand data may be received and used to update the group phase-in profile over time. The forecast profile generation process may be run each time updated data is available or on a periodic basis.

Figure 6:
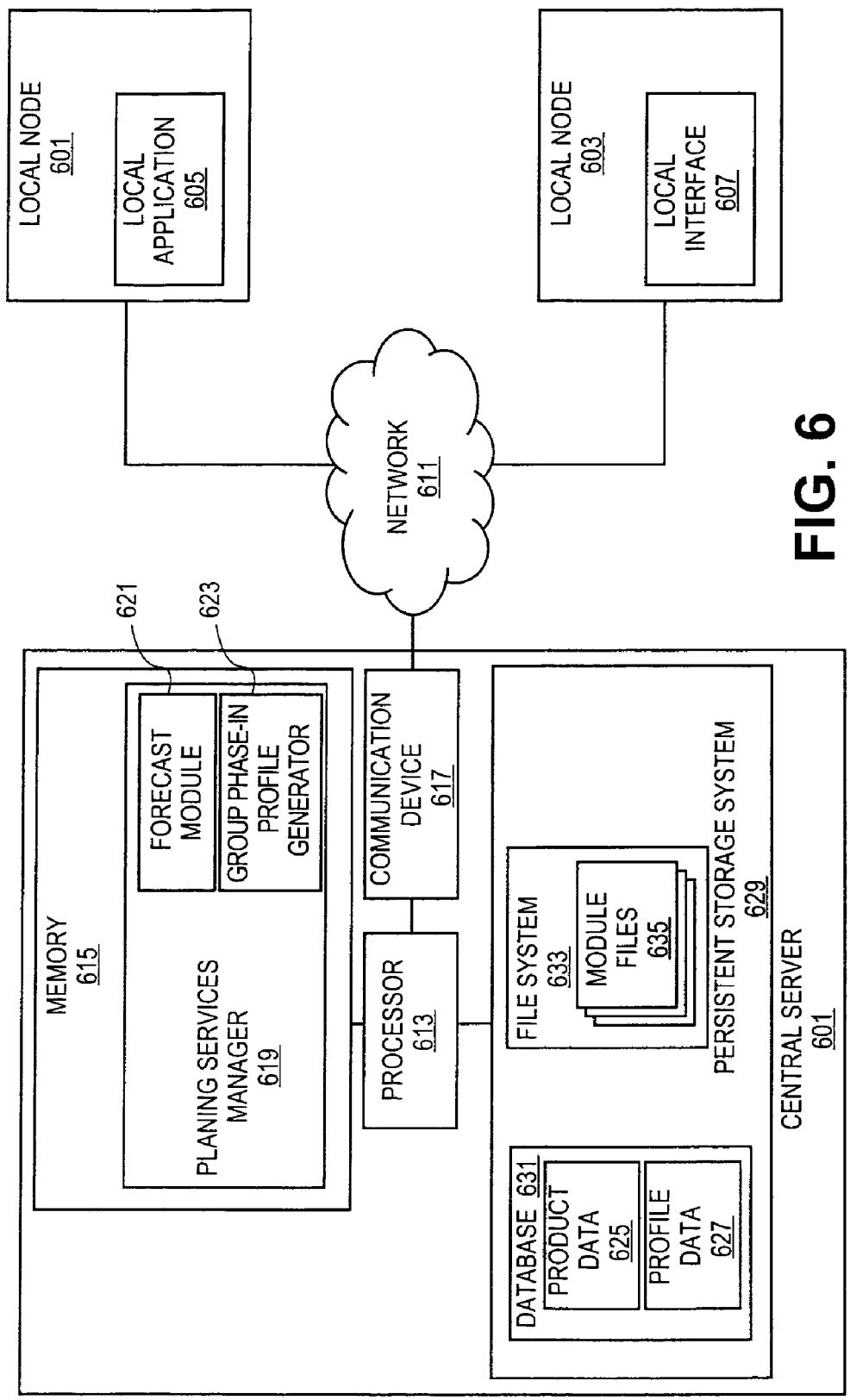
FIG. 6 is a diagram of a distributed new product forecast system.

FIG. 6 is a diagram of one embodiment of a distributed planning service management system. In one embodiment, the planning service management system may be utilized as a local application 605 on a local machine 601. Local application 605 may include a forecast module and phase-in group profile generator module. All product data may be available on the local machine 601. In another embodiment, the local application 605 may access and utilize product data 625, profile data 627, forecast module 621, phase-in group profile generator 623 or similar data or applications on a central server 601 over a network 611. Network 611 may be any type of network including a local area network, wide area network, the Internet or similar communications system. In one embodiment, a local node 603 may execute a local interface 607 for a remote planning service manager 619. The local interface may make communicate over network 611 to provide access to the planning services manager 619.

In one embodiment, central server 601 may include a set of processors 613, working memory 615, communication device 617, persistent storage system 629 and similar components. The planning service manager 619 may be utilized remotely through a remote interface or through a local interface to the server. The planning service manager may include a phase-in group profile generator 623 and forecast module 621. In another embodiment, the forecast module 621 and phase-in group profile generator 623 may be separate applications. The planning service manager 619, forecast module 621 and phase-in group profile generator 623 may have access to product data 625 and profile data 627. Product data 625 may include a set of products, associated history data and additional parameter data including phase-in group and similar data. Profile group data 627 may include stored phase-in group profiles, demand profiles, forecast profiles and similar data. In another embodiment, these profiles may be stored in separate storage structures.

In one embodiment, planning service manager 619, forecast module 621 and group phase-in profile generator 623 may be executed by a set of processors 613 using working memory 615. Files 635 associated with these applications may be stored in a file system 633 in communication with the set of processors 613. The file system 633 may be part of a persistent storage system 629. In another embodiment, the planning service manager 619, forecast module 621 and group phase-in profile generator 623 may be separate modules.

In one embodiment, the persistent storage system 629 may include a database 631 to store product data 625 and profile data 627. The persistent storage system 629 may include a single physical storage device or a set of storage devices including fixed disks, optical storage mediums, magnetic storage mediums or similar devices. Database 631 may be a relational database, object oriented database or similar database system.

In one embodiment, the profile generating and forecasting system may be implemented in software and stored in a machine readable medium that can store or transmit data such as a fixed disk, physical disk, optical disk, CDROM, DVD, floppy disk, magnetic disk, wireless device, infrared device and similar storage and transmission systems and technologies.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A system comprising:
a persistent storage system to store product data and group data;
a group profile generation module in communication with the persistent storage system, the group profile generation module to receive a set of products to be processed, to retrieve product data and group data from the persistent storage system corresponding to the set of products including a phase-in group indicator and production effective date (PED) for each product in the set of products, to filter group data for the set of products based on filtration parameters including a designated time period range, a designated number of time periods, a volume variation limit, a demand variation limit and a PED date, and to eliminate products that do not meet the filtration parameters to generate a group profile; and
a forecast module in communication with the persistent storage system and group profile generation module, the forecast module to determine a new product is assigned to the group profile, to retrieve the group profile for the new product, the group profile having a plurality of demand profiles based on similar products, each demand profile defining an average demand and demand volume that is calculated for each designated time period to a corresponding product PED, and to forecast by a computer system demand for the new product based on one of the plurality of demand profiles by copying the demand volume data and adjusting a designated time period to match a PED and an expected product time period of the new product.

2. The system of claim 1, further comprising:
an interface to access forecast data.

3. The system of claim 1, wherein the profile generation module filters product data based on minimum data requirements.

4. The system of claim 1, further comprising:
a communication device to enable access to the demand forecast from a remote location.

5. The system of claim 1, wherein the forecast module is located on a central server, further comprising:
a local machine to execute a local interface to access the forecast module over a network.

6. The system of claim 1, further comprising:
a remote interface to access the group profile generation module over a network.

7. A method comprising:
receiving a set of products to be processed by a planning service management application;
retrieving product data and group data from a persistent storage system corresponding to the set of products including a phase-in group indicator and production effective date (PED) for each product in the set of products;
filtering group data for the set of products based on filtration parameters including a designated time period range, a designated number of time periods, a volume variation limit, a demand variation limit and a PED date;
eliminating products that do not meet the filtration parameters to generate a group profile;
determining a new product is assigned to the group profile;
retrieving lithe group profile for the new product, the group profile having a plurality of demand profiles based on similar products, each demand profile defining an average demand and demand volume that is calculated for each designated time period subsequent to a corresponding product PED; and
forecasting by a computer system demand for the new product based on one of the plurality of demand profiles by copying the demand volume data and adjusting a designated time period to match a PED and an expected production time period of the new product.

8. The method of claim 7, wherein forecasting comprises:
calculating a demand forecast range for a time period using a standard deviation in the group profile.

9. The method of claim 7, wherein forecasting comprises:
calculating a demand forecast for a period of time based on a category of the one of the demand profiles in the plurality of demand profile in the group profile.

10. The method of claim 7, further comprising:
storing the demand forecast in a forecast profile.

11. The method of claim 7, further comprising:
receiving updated demand history data; and
updating forecasted demand based on updated demand history data.

12. A non-transitory machine readable medium having instruction stored therein which when executed cause a machine to perform a set of operations comprising:
- receiving a set of products to be processed by a planning service management application;
- retrieving product data and group data from a persistent storage system corresponding to the set of products including a phase-in group indicator and production effective date (PED) for each product in the set of products;
- filtering group data for the set of products based on filtration parameters including a designated time period range, a designate number of time periods, a volume variation limit, a demand variation limit and a PED date;
- eliminating products that do not meet the filtration parameters to generate a group profile;
- determining a new product is assigned to the group profile;
- retrieving the group profile for the new product, the group profile having a plurality of demand profiles based on similar products, each demand defining a average demand and demand volume that is calculated for each designated time period subsequent to a corresponding product PED; and
- forecasting demand for the new product based on one of the plurality of demand profiles by copying the demand volume data and adjusting a designated time period to match a PED and an expected product time period of the new product.

13. The non-transitory machine readable medium of claim 12, wherein forecasting comprises:
- calculating a demand forecast range for a time period using a standard deviation in the group profile.

14. The non-transitory machine readable medium of claim 12, wherein forecasting comprises:
- calculating a demand forecast for a period of time based on one of a low demand, medium demand and high demand profile in the plurality of demand profiles.

15. The non-transitory machine readable medium of claim 12, further comprising:
- storing a demand forecast in a forecast profile.

16. The non-transitory machine readable medium of claim 12, further comprising:
- updating forecasted demand on a periodic basis with an updated group profile.

* * * * *

UNITED STATES PATENT AND TRADEMARK OFFICE
CERTIFICATE OF CORRECTION

PATENT NO. : 8,099,320 B2
APPLICATION NO. : 11/250965
DATED : January 17, 2012
INVENTOR(S) : Sheng Li et al.

Page 1 of 1

It is certified that error appears in the above-identified patent and that said Letters Patent is hereby corrected as shown below:

In the Claims:

Column 8, Claim 7, line 44, please delete "lithe" and insert -- the --.

Column 8, Claim 7, line 54, please delete "production" and insert -- product --.

Column 9, Claim 12, line 20, please delete "demand defining a" and insert -- demand profile defining an --.

Signed and Sealed this
Twenty-third Day of April, 2013

Teresa Stanek Rea
*Acting Director of the United States Patent and Trademark Office*